(12) United States Patent
Bhatia et al.

(10) Patent No.: US 8,717,152 B2
(45) Date of Patent: May 6, 2014

(54) SOUND TO HAPTIC EFFECT CONVERSION SYSTEM USING WAVEFORM

(75) Inventors: Satvir Singh Bhatia, Plano, TX (US);
Kanav Gandhi, Sunnyvale, CA (US);
Christopher J. Ullrich, Ventura, CA (US); Juan Manuel Cruz-Hernandez, Montreal (CA); Herve Thu Timone, Montreal (CA); Jason Hoi Fun Lau, Foster City, CA (US)

(73) Assignee: Immersion Corporation, San Jose, CA (US)

( * ) Notice: Subject to any disclaimer, the term of this patent is extended or adjusted under 35 U.S.C. 154(b) by 149 days.

(21) Appl. No.: 13/366,010

(22) Filed: Feb. 3, 2012

(65) Prior Publication Data

US 2012/0206247 A1 Aug. 16, 2012

Related U.S. Application Data

(60) Provisional application No. 61/441,792, filed on Feb. 11, 2011.

(51) Int. Cl.
*H04B 3/36* (2006.01)

(52) U.S. Cl.
USPC .......................................... 340/407.1; 463/30

(58) Field of Classification Search
USPC ........... 340/407.1; 345/156; 463/30; 715/702
See application file for complete search history.

(56) References Cited

U.S. PATENT DOCUMENTS

| | | | |
|---|---|---|---|
| 5,675,709 A * | 10/1997 | Chiba | 704/213 |
| 5,684,722 A | 11/1997 | Thorner et al. | |
| 5,842,163 A * | 11/1998 | Weintraub | 704/251 |
| 6,183,367 B1 * | 2/2001 | Kaji et al. | 463/42 |
| 6,285,351 B1 * | 9/2001 | Chang et al. | 463/30 |
| 6,422,941 B1 | 7/2002 | Thorner et al. | |
| 7,091,948 B2 * | 8/2006 | Chang et al. | 715/701 |
| 7,979,146 B2 | 7/2011 | Ullrich et al. | |

(Continued)

FOREIGN PATENT DOCUMENTS

| | | |
|---|---|---|
| EP | 0144774 A2 | 6/1985 |
| WO | 9609617 A1 | 3/1996 |
| WO | 03032289 A1 | 4/2003 |
| WO | 2010104953 A1 | 9/2010 |

OTHER PUBLICATIONS

Tony Fisher, "Butterworth / Bessel / Chebyshev Filters," http://www-users.cs.york.ac.uk/~fisher/mkfilter/trad.html (last visited Jan. 29, 2012).
Henry Da Costa et al., U.S. Appl. No. 13/439,241, filed Apr. 4, 2012.
Juan Manuel Cruz-Hernandez et al., U.S. Appl. No. 13/365,984, filed Feb. 3, 2012.

(Continued)

*Primary Examiner* — John A Tweel, Jr.
(74) *Attorney, Agent, or Firm* — Miles & Stockbridge P.C.

(57) ABSTRACT

A haptic conversion system is provided that intercepts frames of audio data, such as a digital audio signal, converts the frames into a haptic signal, and plays the created haptic signal through an actuator to produce haptic effects. The haptic signal is based on a maximum value of each audio data frame, which defines a magnitude of the haptic signal. The haptic signal is applied to the actuator configured to receive the haptic signal, where the actuator utilizes the haptic signal to generate the one or more haptic effects.

25 Claims, 9 Drawing Sheets

(56) References Cited

U.S. PATENT DOCUMENTS

| | | |
|---|---|---|
| 8,000,825 B2 | 8/2011 | Ullrich et al. |
| 8,378,964 B2 | 2/2013 | Ullrich et al. |
| 2003/0067440 A1 | 4/2003 | Rank |
| 2009/0231276 A1 | 9/2009 | Ullrich et al. |
| 2010/0156818 A1 | 6/2010 | Burrough et al. |
| 2010/0287311 A1 | 11/2010 | Cruz-Hernandez et al. |
| 2011/0102160 A1 | 5/2011 | Heubel et al. |
| 2011/0128132 A1 | 6/2011 | Ullrich et al. |
| 2011/0202155 A1 | 8/2011 | Ullrich et al. |
| 2011/0215913 A1 | 9/2011 | Ullrich et al. |
| 2013/0131851 A1 | 5/2013 | Ullrich et al. |
| 2013/0207917 A1 | 8/2013 | Cruz-Hernandez et al. |

OTHER PUBLICATIONS

Bhatia et al., U.S. Appl. No. 13/661,140, filed Oct. 26, 2012.
Christopher J. Ullrich, U.S. Appl. No. 13/785,166, filed Mar. 5, 2013.
Christopher J. Ullrich, U.S. Appl. No. 13/788,487, filed Mar. 7, 2013.
Juan Manuel Cruz-Hernandez, U.S. Appl. No. 13/803,778, filed Mar. 14, 2013.
Juan Manuel Cruz-Hernandez, U.S. Appl. No. 13/799,059, filed Mar. 13, 2013.
Amaya Becvar Weddle et al., U.S. Appl. No. 14/019,606, filed Sep. 6, 2013.
Jamal Saboune et al., U.S. Appl. No. 14/020,461, filed Sep. 6, 2013.
Jamal Saboune et al., U.S. Appl. No. 14/020,502, filed Sep. 6, 2013.

\* cited by examiner

US 8,717,152 B2

SOUND TO HAPTIC EFFECT CONVERSION SYSTEM USING WAVEFORM

CROSS-REFERENCE TO RELATED APPLICATIONS

This application claims priority of U.S. Provisional Patent Application Ser. No. 61/441,792, filed on Feb. 11, 2011, the disclosure of which is hereby incorporated by reference.

FIELD

One embodiment is directed generally to a device, and more particularly, to a device that produces haptic effects.

BACKGROUND

Haptics is a tactile and force feedback technology that takes advantage of a user's sense of touch by applying haptic feedback effects (i.e., "haptic effects"), such as forces, vibrations, and motions, to the user. Devices, such as mobile devices, touchscreen devices, and personal computers, can be configured to generate haptic effects. In general, calls to embedded hardware capable of generating haptic effects (such as actuators) can be programmed within an operating system ("OS") of the device. These calls specify which haptic effect to play. For example, when a user interacts with the device using, for example, a button, touchscreen, lever, joystick, wheel, or some other control, the OS of the device can send a play command through control circuitry to the embedded hardware. The embedded hardware then produces the appropriate haptic effect.

Such devices can also be configured to play audio data, such as a digital audio signal. For example, such devices can include applications configured to play video data, such as a movie or video game, that contains an audio portion, or audio data, such as a song. Similar to haptics, calls to additional embedded hardware capable of generating audio effects (such as speakers) can be programmed within the OS of the device. Thus, the OS of the device can send a play command through control circuitry to the additional embedded hardware, where the additional embedded hardware then produces the appropriate audio effect.

SUMMARY

One embodiment is a system that converts an audio signal into one or more haptic effects. The system receives a data frame of the audio signal. The system further generates a maximum value of the data frame. The system further transforms the data frame. The system further generates at least one sine carrier waveform based on a maximum value of the transformed data frame. The system further mixes the transformed data frame with the at least one sine carrier waveform to generate a modulated data frame. The system further generates a haptic signal based on the maximum value, and the modulated data frame. The system further sends the haptic signal to an actuator to generate the one or more haptic effects.

BRIEF DESCRIPTION OF THE DRAWINGS

Further embodiments, details, advantages, and modifications will become apparent from the following detailed description of the preferred embodiments, which is to be taken in conjunction with the accompanying drawings.

DETAILED DESCRIPTION

One embodiment is a haptic conversion system that can intercept one or more frames of audio data, such as a digital audio signal, transform the one or more frames, convert the one or more transformed frames into a haptic signal, and play the created haptic signal through an actuator to produce one or more haptic effects. The haptic signal can include a waveform, where a waveform is a set of one or more signal values in a pulse-coded modulation ("PCM") format. The haptic signal can be applied to a type of actuator configured to receive a waveform, where the actuator can utilize the waveform to generate the one or more haptic effects.

Figure 1:
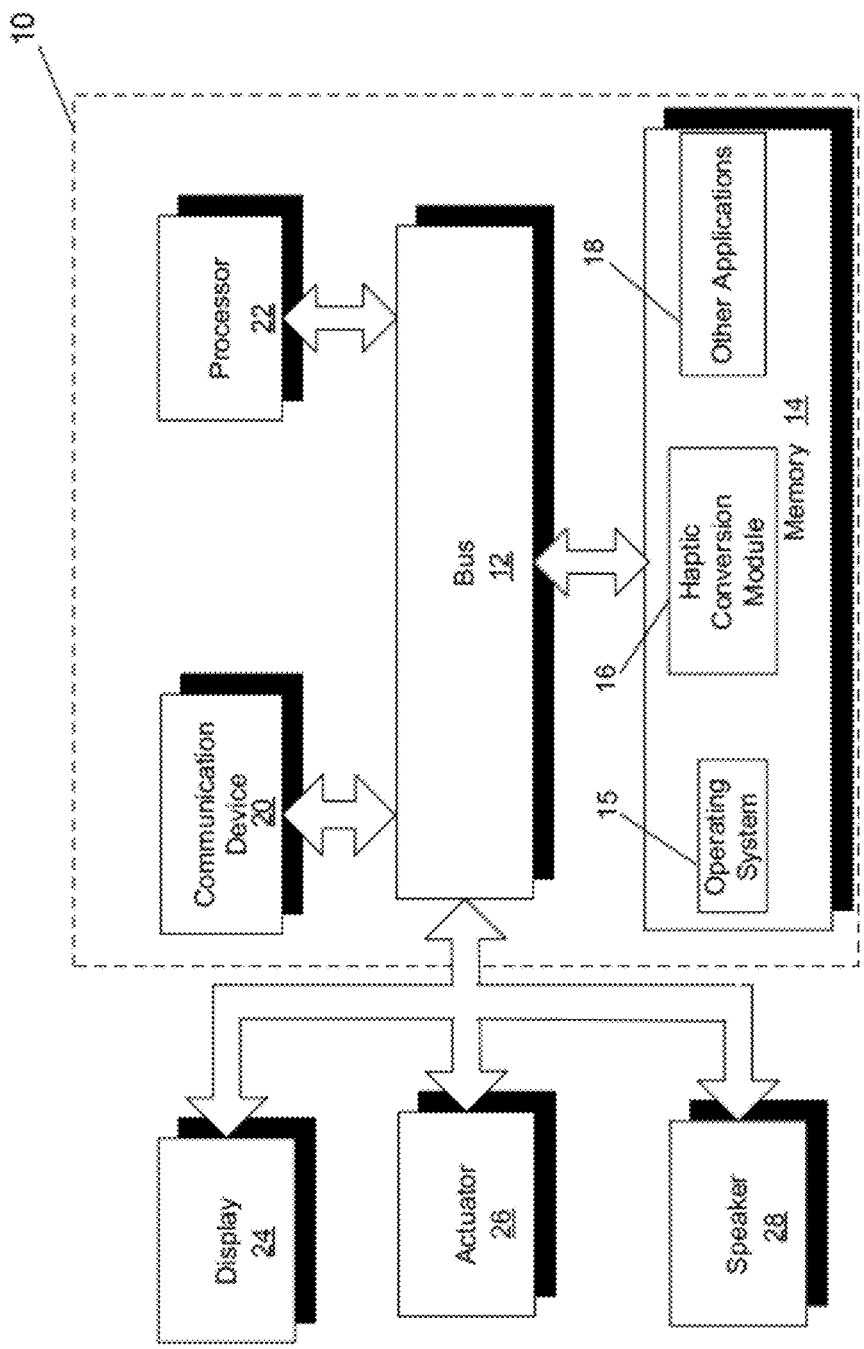
FIG. 1 illustrates a block diagram of a haptic conversion system in accordance with one embodiment of the invention.

FIG. 1 illustrates a block diagram of a haptic conversion system 10 in accordance with one embodiment of the invention. In one embodiment, system 10 is part of a mobile device, and system 10 provides a haptic conversion functionality for the mobile device. Although shown as a single system, the functionality of system 10 can be implemented as a distributed system. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer-readable medium.

A computer-readable medium may be any available medium that can be accessed by processor 22 and may include both a volatile and nonvolatile medium, a removable and non-removable medium, a communication medium, and a storage medium. A communication medium may include computer readable instructions, data structures, program modules or other data in a modulated data signal such as a carrier wave or other transport mechanism, and may include any other form of an information delivery medium known in the art. A storage medium may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of a storage medium known in the art.

In one embodiment, memory 14 stores software modules that provide functionality when executed by processor 22. The modules include an operating system 15 that provides operating system functionality for system 10, as well as the rest of a mobile device in one embodiment. The modules further include a haptic conversion module 16 that converts an audio signal into a haptic signal that is used to produce one or more haptic effects, as disclosed in more detail below. In certain embodiments, haptic conversion module 16 can comprise a plurality of modules that each provide specific individual functionality for converting an audio signal into a haptic signal that is used to produce one or more haptic effects. System 10 will typically include one or more additional application modules 18 to include additional functionality, such as MOTIV® Haptic Development Platform by Immersion Corporation.

System 10, in embodiments that transmit and/or receive data from remote sources, further includes a communication device 20, such as a network interface card, to provide mobile wireless network communication, such as infrared, radio, Wi-Fi, cellular network, or other next-generation wireless-data network communication. In other embodiments, communication device 20 provides a wired network connection, such as an Ethernet connection or a modem.

Processor 22 is further coupled via bus 12 to a display 24, such as a Liquid Crystal Display ("LCD"), for displaying a graphical representation or user interface to a user. The display 24 may be a touch-sensitive input device, such as a touch screen, configured to send and receive signals from processor 22, and may be a multi-touch touch screen.

System 10 further includes one or more actuators 26. Processor 22 may transmit a haptic signal associated with a haptic effect to actuator 26, which in turn outputs haptic effects. Actuator 26 may be, for example, an electric motor, an electro-magnetic actuator, a voice coil, a shape memory alloy, an electro-active polymer, a solenoid, an eccentric rotating mass motor ("ERM"), a linear resonant actuator ("LRA"), a piezoelectric actuator, a high bandwidth actuator, an electro-active polymer ("EAP") actuator, an electrostatic friction display, or an ultrasonic vibration generator.

In some embodiments, system 10 further includes one or more speakers 28. Processor 22 may transmit an audio signal to speaker 28, which in turn outputs audio effects. Speaker 28 may be, for example, a dynamic loudspeaker, an electrodynamic loudspeaker, a piezoelectric loudspeaker, a magnetostrictive loudspeaker, an electrostatic loudspeaker, a ribbon and planar magnetic loudspeaker, a bending wave loudspeaker, a flat panel loudspeaker, a heil air motion transducer, a plasma arc speaker, and a digital loudspeaker.

Figure 2:
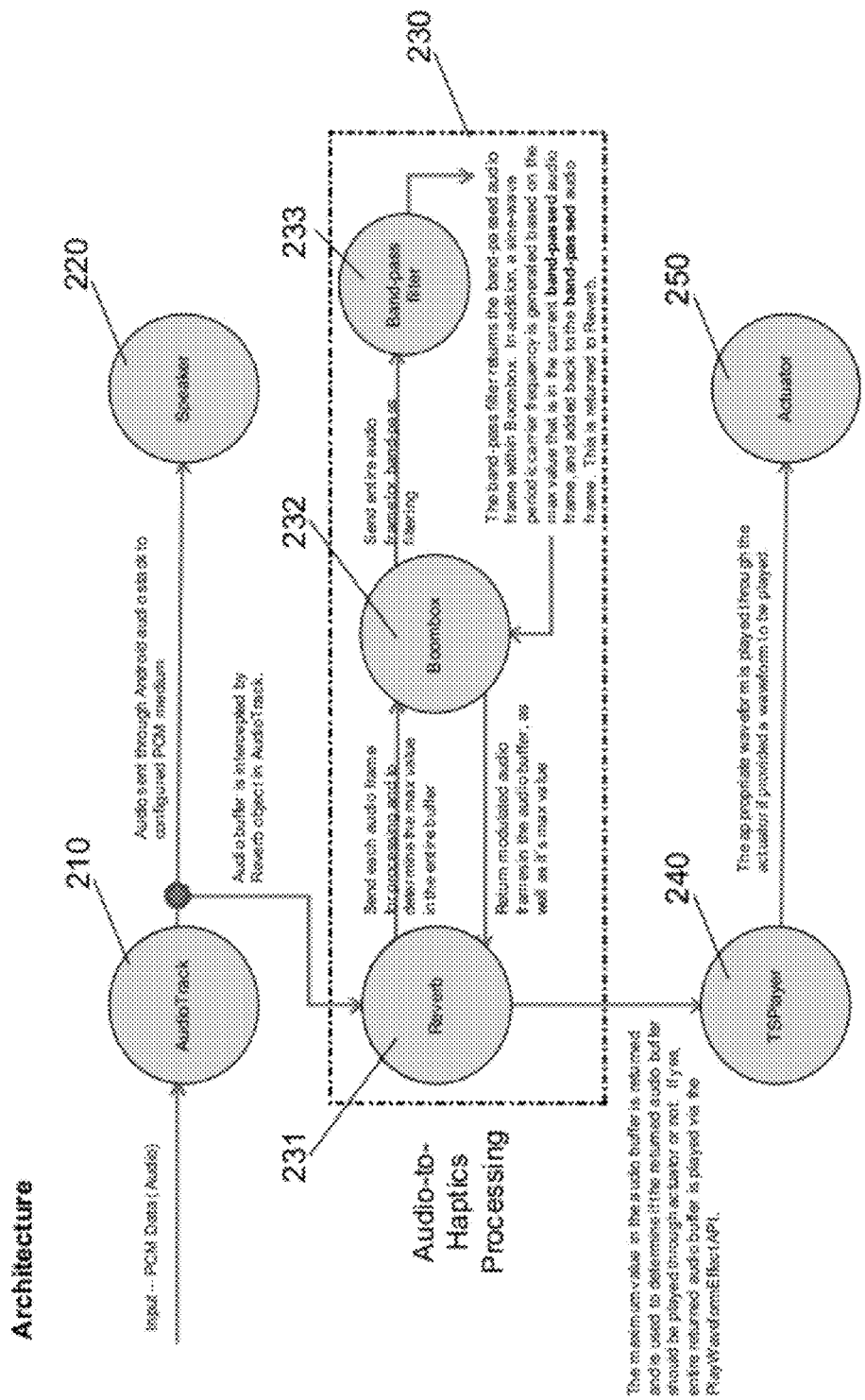
FIG. 2 illustrates an architecture diagram of a haptic conversion system, according to one embodiment of the invention.

FIG. 2 illustrates an architecture diagram of a haptic conversion system, according to one embodiment of the invention. In the illustrated embodiment, the haptic conversion system includes audio track module 210 and speaker 220. Audio track module 210 is a module of an operating system for a device (such as a mobile device) configured to receive one or more PCM audio buffers, and stream the one or more PCM audio buffers to speaker 220, where each PCM audio buffer comprises one or more PCM audio data frames. In one embodiment, audio track module 210 is an Android AudioTrack module of an Android® operating system for a mobile device. Speaker 220 is a speaker configured to receive one or more PCM audio buffers and configured to output one or more audio effects. Speaker 220 can be, for example, a dynamic loudspeaker, an electrodynamic loudspeaker, a piezoelectric loudspeaker, a magnetostrictive loudspeaker, an electrostatic loudspeaker, a ribbon and planar magnetic loudspeaker, a bending wave loudspeaker, a flat panel loudspeaker, a heil air motion transducer, a plasma arc speaker, and a digital loudspeaker.

The haptic conversion system also includes a haptic conversion module 230, according to the embodiment. In certain embodiments, haptic conversion module 230 is identical to haptic conversion module 16 of FIG. 1. In the illustrated embodiment, haptic conversion module 230 is comprised of three sub-modules: reverb module 231, boombox module 232, and band-pass filter 233. However, this is merely an example embodiment, and in alternate embodiments, haptic conversion module 230 can be comprised of any number of sub-modules, or haptic conversion module 230 can be a single module.

According to the embodiment, reverb module 231 is configured to intercept the one or more audio buffers that audio track module 210 streams to speaker 220. Reverb module 231 is further configured to send each audio data frame of each audio buffer to boombox module 232. Boombox module 232 is configured to analyze each audio data frame and calculate a maximum value for each audio data frame. The calculating of the maximum value for each audio data frame, performed by boombox module 232, is further described in greater detail in relation to FIGS. 4-7. Boombox module 232 is further configured to return the maximum value for each audio data frame to reverb module 231.

Boombox module 232 is further configured to send each audio data frame of each audio buffer to band-pass filter 233. Band-pass filter 233 is configured to band-pass filter each audio data frame of each audio buffer. By band-pass filtering each audio data frame, band-pass filter 233 can filter on one or more frequency bands of frequency signals of any given range in a given audio buffer (e.g., a single frequency band of frequency signals in the 0-500 Hz range). Thus, all signals within this frequency range can be extracted to create a new audio buffer of only these signals. The effect yielded from this filtering can be a "bass-boost" or "subwoofer" type of signal. Band-pass filter 233 is further configured to return each band-pass filtered audio data frame to boombox module 232. In alternate embodiments, band-pass filter 233 is not a filter, but a transformation module (such as a digital signal processor ("DSP") process, a state machine, or other type of programmatic logic). In these alternate embodiments, the transformation module can transform the received audio data frame into a new audio data frame, where the transformation is not necessary a filtering transformation.

Boombox module 232 is further configured, for each band-pass filtered audio data frame, to generate a sine-wave periodic carrier frequency (also identified as a "sine carrier waveform") based on the maximum value of the band-pass filtered audio data frame. The generation of the sine-wave periodic carrier frequency is further described in greater detail in relation to FIG. 3. In alternate embodiments, boombox module 232 can be further configured to generate a plurality of sine-wave periodic frequencies. For each band-pass filtered audio data frame, boombox module 232 is further configured to add the generated sine-wave periodic carrier frequency to the band-pass filtered audio data frame (also identified as mixing the generated sine-wave periodic carrier frequency with the band-pass filtered audio data frame), thus modulating the band-pass filtered audio data frame. Boombox module 232 is further configured to return each modulated audio data frame to reverb module 231.

The haptic conversion system also includes a haptic effect player module 240 and an actuator 250. Haptic effect player module 240 is a module that is embedded within a device (such as a mobile device), and that is configured to play one or more haptic effects at an actuator by sending one or more haptic signals to the actuator. In one embodiment, haptic effect player module 240 is a TouchSense Player® module by Immersion Corporation. Actuator 250 is an actuator configured to receive one or more haptic signals, and configured to output one or more haptic effects. In certain embodiments, actuator 250 is an actuator configured to receive a waveform, where the waveform is used to control a magnitude and precision of a waveform effect when played through the actuator. Actuator 250 can be, for example, a piezoelectric actuator, a high bandwidth actuator, or an EAP actuator.

According to the embodiment, reverb module 231 is configured to determine whether each maximum value of each audio data frame is greater than a specific threshold. When the maximum value of the audio data frame is greater than the specific threshold, reverb module 231 is configured to call an application program interface ("API") of haptic effect player module 240, and send haptic effect player module 240 the corresponding modulated audio data frame as a parameter of the API. When the maximum value of the audio data frame is not greater than the specific threshold, reverb module 231 is configured to ignore the audio data frame, and not send the corresponding modulated audio data frame to haptic effect player module 240. In certain embodiments, the API of haptic effect player module 240 is a "ImmVibeAppendWaveformEffect" API of a TouchSense Player® module by Immersion Corporation. In other embodiments the API could be "ImmVibePlayMagSweepEffect" or "ImmVibePlayPeriodicEffect." The API of haptic effect player module 240 sends the modulated audio data frame to actuator 250, where actuator 250 is configured to play an appropriate waveform based on the modulated audio data frame. According to the embodiment, the modulated audio data frame serves as a waveform that is played by actuator 250, where the waveform includes one or more frequency bands that are emphasized in addition to a periodic haptic signal, and where the modulated audio data frame can control a precision of the waveform played by actuator 250. By playing a waveform, actuator 250 produces a haptic effect.

Figure 3:
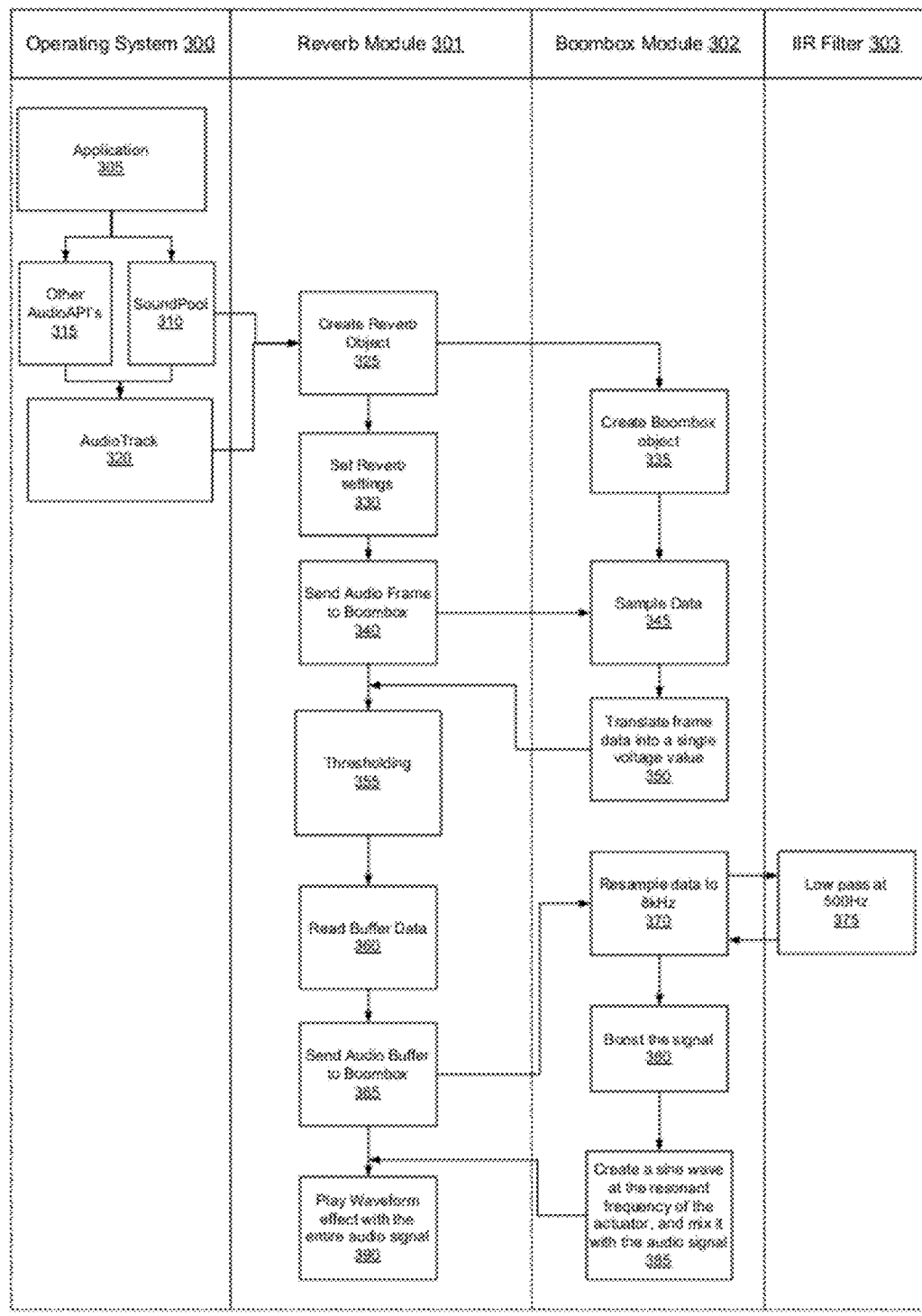
FIG. 3 illustrates a flow diagram of functionality performed by a haptic conversion system, according to one embodiment of the invention.
Figure 9:
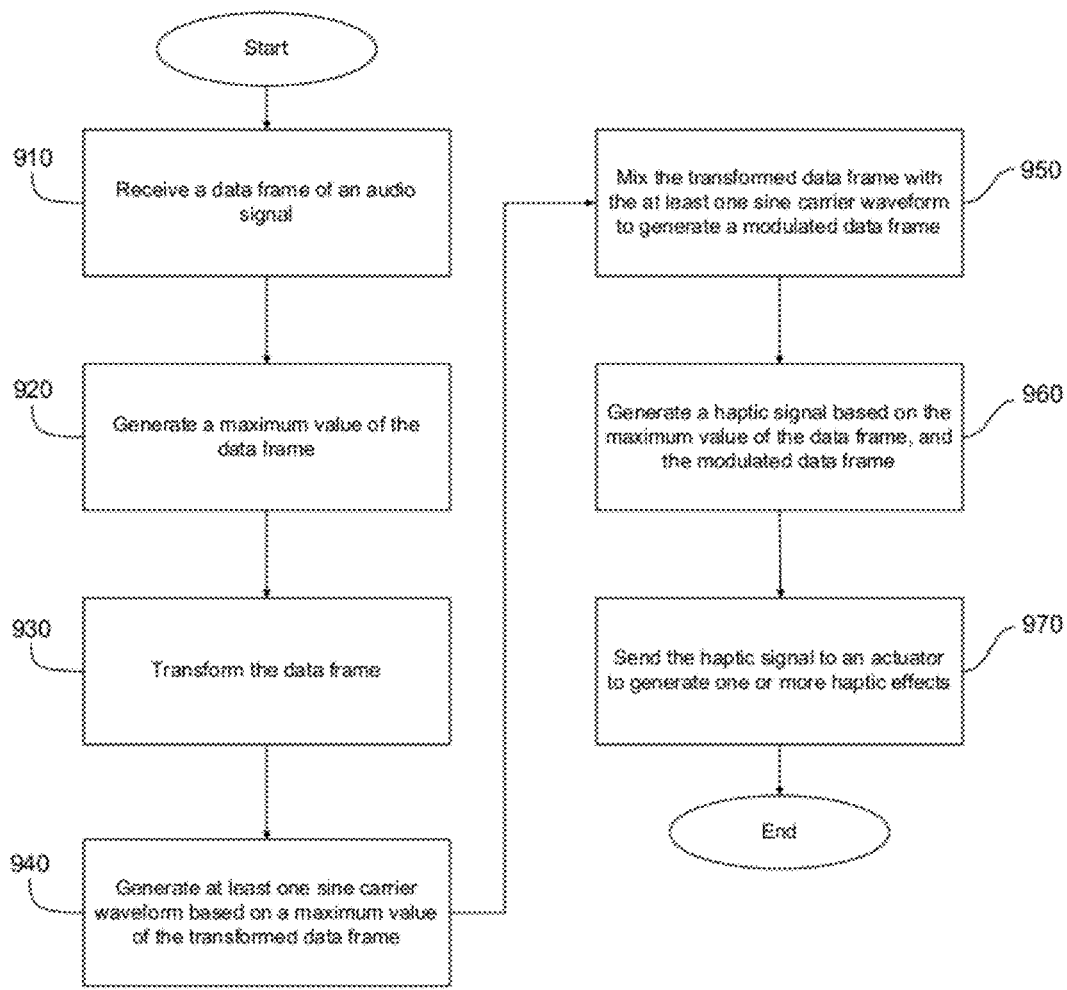
FIG. 9 illustrates a flow diagram of the functionality of a haptic conversion module, according to one embodiment of the invention.

FIG. 3 illustrates a flow diagram of functionality performed by a haptic conversion system, according to one embodiment of the invention. In one embodiment, the functionality of FIG. 3, as well as the functionality of FIG. 9, is implemented by software stored in memory or other computer-readable or tangible media, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software. Furthermore, in alternate embodiments, the functionality may be performed by hardware using analog components.

According to the embodiment, the haptic conversion system includes an operating system 300, a reverb module 301, a boombox module 302, and an infinite impulse response ("IIR") filter 303. Operating system 300 is an operating system of a device (such as a mobile device). In the illustrated embodiment, operating system 300 is an Android® operating system for a mobile device. Reverb module 301, boombox module 302, and IIR filter 303 are sub-modules of a haptic conversion module (such as haptic conversion module 16 of FIG. 1). In certain embodiments, reverb module 301, boombox module 302, and IIR filter 303 are identical to reverb module 231, boombox module 232, and band-pass filter 233, respectively, of FIG. 2.

According to the embodiment, at 305, an application configured to create an audio signal is created. The application is any application that can be executed within operating system 300. In the illustrated embodiment, the application is an Android® application. The flow proceeds to 310. At 310, a "SoundPool" object is created by the application, where a SoundPool object is an instance of a SoundPool API (which is an Android® API), and where a SoundPool object manages and plays audio resources for the application. The SoundPool object can include a collection of audio samples that can be loaded into a memory of a device from a resource stored within the device, or from a file stored within a file system of the device. The SoundPool object can decode the collection of audio samples into a raw 16-bit PCM mono or stereo buffer. The flow proceeds to 315. At 315, other audio objects are created by the application, where the other audio objects are instances of other audio APIs. The other audio objects can also decode audio samples into a 16-bit PCM audio buffer. The flow proceeds to 320. At 320, an AudioTrack object is created by either the SoundPool object or one of the other audio objects. An AudioTrack object is configured to receive one or more PCM audio buffers and stream the one or more PCM audio buffers.

The flow proceeds to 325. At 325, a reverb object is created. A reverb object is an instance of reverb module 301, where the reverb object is configured to process one or more audio data frames of a PCM audio buffer sent by the AudioTrack object, as previously described in relation to FIG. 2. The flow proceeds to 330. At 330, one or more settings of the reverb object are set. Example of reverb settings include: enable/disable haptic conversion, enable/disable haptic conversion for media, select a strength of haptic conversion from three selections (e.g., light, moderate, and strong), and select one or more applications (for example, from a list) for which haptic conversion is enabled. In certain embodiments, the above settings are stored in an extensible markup language ("XML") file. The above settings can be read from the XML file and stored within the reverb object, where the reverb object can be enabled for certain applications, and disabled for other applications. In certain embodiments, three values, identified as strength, density, and sharpness, are based on three factors: (1) strength setting (e.g., light, moderate, and strong), (2) haptic theme (that maps user interface events with haptic effects), and (3) actuator type. The strength, density, and sharpness values can be generated and stored within the reverb object. The flow proceeds to 335. At 335, a boombox object is created by the reverb object. A boombox object is an instance of boombox module 302, where the boombox object is configured to receive an audio data frame from the reverb object, generate a maximum value of the audio data frame, send the maximum value of the audio data frame to the reverb object, send the audio data frame to IIR filter 303 to be filtered, generate a sine-wave periodic carrier frequency, and mix the generated sine-wave periodic carrier frequency with the filtered audio data frame, as previously described in relation to FIG. 2. In certain embodiments, the strength and density values that are generated and stored within the reverb object can also be stored within the boombox object.

The flow proceeds to 340. At 340, the reverb object sends an audio data frame of a PCM audio buffer, that is received from an AudioTrack object, to the boombox object. The flow proceeds to 345. At 345, the boombox object samples data contained within the audio data frame. Such sampling is further described in greater detail in relation to FIGS. 4-7. The flow proceeds to 350. At 350, the boombox object translates the data contained within the audio data frame into a single voltage value (i.e., a maximum value). Such translation is also further described in greater detail in relation to FIGS. 4-7. The boombox object then returns the single voltage value to the reverb object.

The flow proceeds to 355. At 355, the reverb object performs a thresholding task. More specifically, the reverb object determines whether the maximum value of the audio data frame, received from the boombox object, is greater than a specified threshold. The maximum value returned is first linearly mapped to a force value, which in one embodiment can vary between 0 and 10,000. For example, the threshold may be specified as 1,000. In this example, if the value of the force is greater than 1,000, then the audio data frame is written to an audio buffer, to be subsequently sent to an actuator. If the value of the force is less than or equal to 1,000, then the audio data frame is "dropped" (i.e., is not written to the audio buffer), and is not subsequently sent to an actuator. Thus, according to the embodiment, not every audio data frame is necessarily played at the actuator. The flow proceeds to 360. At 360, the reverb object reads the audio data frame from the audio buffer, assuming that the audio data frame was not "dropped" at 355.

The flow proceeds to 365. At 365, the reverb object sends the audio data frame, that was stored within the audio data buffer, to the boombox object. The flow proceeds to 370. At 370, the boombox object resamples the audio data frame, for example, at 8 KHz mono audio. The boombox object subsequently sends the resampled audio data frame to the IIR filter 303. The flow proceeds to 375. At 375, IIR filter 303 low-pass filters the received audio data frame, for example, at 500 Hz. In the example, by low-pass filtering the audio data frame, IIR filter 303 filters on a single frequency band of low-frequency signals within the audio data frame (e.g., 0-500 Hz). IIR filter 303 subsequently returns the low-pass filtered audio data frame to the boombox object. In alternate embodiments, IIR filter 303 is not a filter, but a transformation module (such as a DSP process, a state machine, or other type of programmatic logic). In these alternate embodiments, the transformation module can transform the received audio data frame into a new audio data frame, where the transformation is not necessary a filtering transformation.

The flow proceeds to 380. At 380, the boombox object boosts the audio data signal contained within the filtered audio data frame. Boosting the audio data signal can involve multiplying all the PCM values of the audio data signal by a constant. The flow proceeds to 385. At 385, the boombox object creates a sine carrier waveform (also identified as a "sine-wave periodic carrier frequency" or "sine wave") at a resonant frequency of an actuator, or any other frequency desired, and mixes the sine carrier waveform with the audio data signal contained within the filtered audio data frame. More specifically, the boombox object scans the filtered audio data frame for its maximum value (i.e., amplitude), identified as A. Then, the boombox object utilizes a sine function (such as a C++ programming language sin( ) function) to retrieve a calculated sine value of the filtered audio data frame, using the formula, val=sin(2*pi*frequency*phase), where frequency is a frequency of the filtered audio data frame, and phase is a phase of the filtered audio data frame. Subsequently, the boombox object multiplies the calculated sine value (i.e., val) by the maximum value, or amplitude, of the filtered audio frame (i.e., A). This calculation creates a full sine carrier waveform. The boombox object then calculates a mixed value, where the mixed value represents a mix of the filtered audio data frame and the full sine carrier waveform. More specifically, the boombox object calculates the mixed value according to the formula, final=(mix*bpSample)+((1−mix)*(A*val)), where final is a mixed value representing a mix of the filtered audio data frame and the full sine carrier waveform, bpSample is the filtered audio data frame, mix is a decimal value between 0 and 1, A is the maximum value, or amplitude, of the filtered audio frame, and val is the calculated sine value of the full sine carrier waveform. Thus, according to the embodiment, the mix of the filtered audio data frame and the full sine carrier waveform is normalized by ensuring the mixed value representing a mix of the filtered audio data frame and the full sine carrier waveform (i.e., final) never exceeds 1. If, instead, the filtered audio data frame (i.e., bpSample) is merely added to a product of the maximum value, or amplitude, of the filtered audio frame (i.e., A) and the calculated sine value of the full sine carrier waveform (i.e., val), then the result yields an overpowering, undesired, and noisy haptic signal. This can be avoided by normalizing the mix of the filtered audio data frame and the full sine carrier waveform, as described above. The boombox object then returns the mix of the filtered audio data frame and the full sine carrier waveform to the reverb object. In other embodiments, multiple simultaneous carrier signals (at different frequencies) may be used to create a high bandwidth output signal. In these embodiments, summation of individual carriers is performed using an extension of the algorithm presented here.

The flow proceeds to 390. At 390, the reverb object plays a waveform effect at an actuator using the mix of the filtered audio data frame and the full sine carrier waveform. By playing the waveform effect at the actuator, the reverb object causes the actuator to produce a haptic effect.

As previously described, a haptic conversion module (such as haptic conversion module 16 of FIG. 1) processes an audio signal, contained within a PCM audio data buffer. As also previously described, the processing of the audio signal includes sampling each audio data frame of a PCM audio data buffer, calculating a maximum value for each audio data frame of a PCM audio data buffer, and magnitude filtering. Such processing of the audio signal is now described in greater detail.

According to certain embodiments, an envelope of the audio signal is first extracted. An envelope can be extracted using all frequencies of an original audio signal or a filtered version of the original audio signal. However, the envelope itself does not have the same frequency content as the original audio signal.

In one embodiment, an audio data frame is taken from the audio signal. As an example, an audio data frame may have a frame length of 1 ms. As another example, the audio data frame may have a frame length of 10 ms. A 1 ms audio data frame captures the envelope of frequencies above 500 Hz but lower frequencies are not captured, and "leak" through. A 10 ms frame captures the envelope of frequencies above 50 Hz, etc. In one embodiment, an absolute value of each sample in the frame is computed. In an alternate embodiment, a square of each sample in the frame is computed, rather than an absolute value. Such processing constitutes the sampling of an audio data frame performed by a haptic conversion module (such as haptic conversion module 16 of FIG. 1).

A maximum value "$V_1$" of the absolute sample values (or the square sample values in an alternate embodiment) is computed. The maximum value, "$V_1$" can then be converted using a linear conversion function, as described below in relation to FIG. 4.

Figure 4:
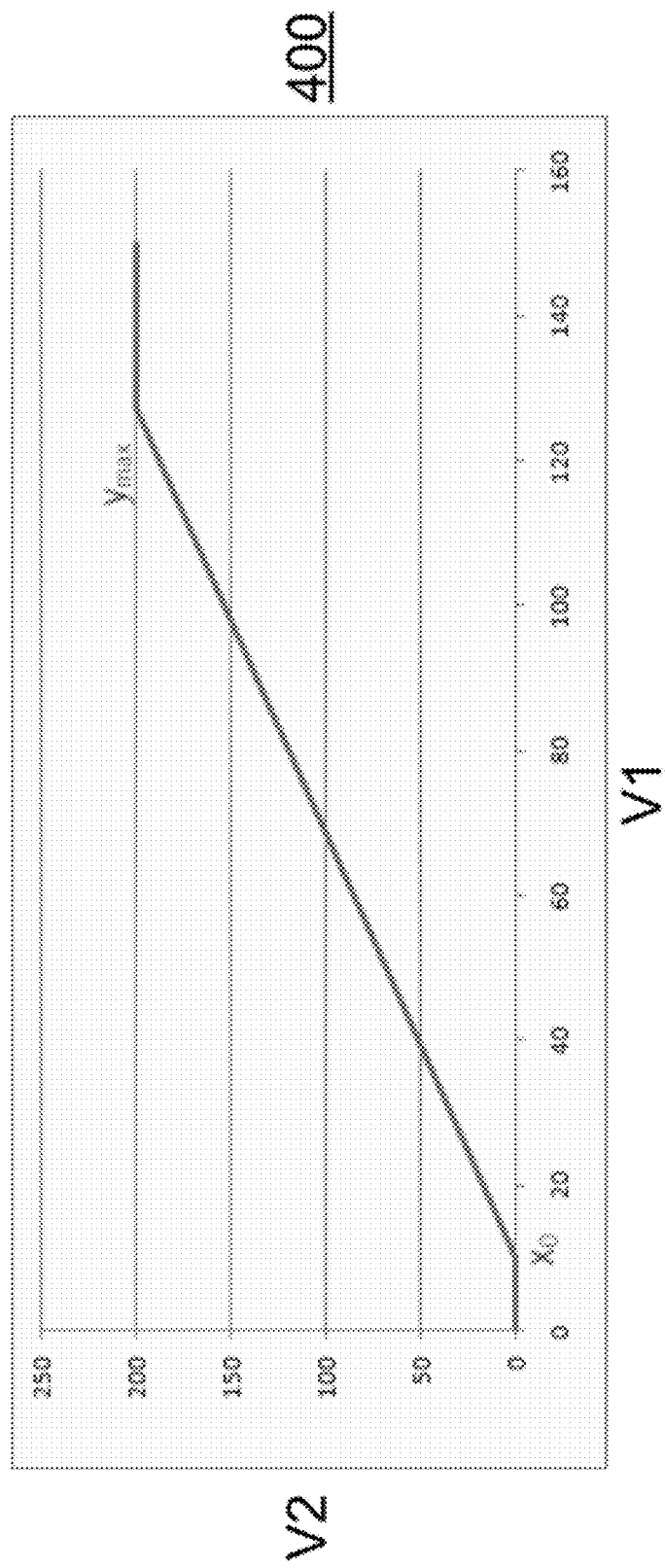
FIG. 4 illustrates a linear conversion function that is applied to control a range of an output value, according to one embodiment of the invention.

FIG. 4 illustrates a linear conversion function 400 that is applied to control a range of an output value, according to one embodiment of the invention. According to the embodiment, linear conversion function 400 can be applied to control a range of the output value "$V_1$" to obtain a new value "$V_2$," as illustrated in FIG. 4. According to the illustrated embodiment, "$x_0$" can vary within a given range, such as [2 ... 20]. "$x_0$" defines the minimum value "$V_1$" that will be converted into a new value "$V_2$". "$y_{max}$" can vary within a given range, such as example [60 ... 255]. "$y_{max}$" defines the maximum converted value "$V_2$". If "$V_1$" is less or equal to "$x_0$", the output value "$V_2$" is equal to 0. If "$V_1$" is greater than "$x_0$", the output value "$V_2$" is obtained by multiplying "$V_1$" by the slope of the function. "$V_2$" is clamped and cannot be greater than "$V_{max}$". In an alternate embodiment, a more general mapping using ($x_0$, $y_0$) and ($x_1$, $y_{max}$) can also be used. Such processing constitutes the calculating of a maximum value of an audio data frame performed by a haptic conversion module (such as haptic conversion module 16 of FIG. 1).

Thus, according to the embodiment, an envelope of an audio signal is mapped to an amplitude of a haptic signal, where the amplitude of the haptic signal is filtered. In an alternate embodiment, the envelope of the audio signal can first be filtered, and then the filtered envelope of the audio signal can be mapped to an amplitude of a haptic signal.

Magnitude filtering, performed by a haptic conversion module (such as haptic conversion module 16 of FIG. 1), is now described in greater detail. A magnitude (or strength) "$V_3$" of a haptic effect is computed using the previous value "$V_2$." In certain embodiments, "$V_3$" can be mapped to a frequency. In other embodiments, "$V_3$" can be mapped to a set of frequency values. If "$V_2$" of iteration "i" is smaller than "$V_2$" of iteration "i−1", then the output "$V_3$" can be set to zero or some other small value, or else the output remains unchanged ("$V_3$"="$V_2$"). This specific technique can capture the peak values of the signal that represents a haptic event, and automatically associate to that haptic event an independent haptic effect. This technique can also be used to let an actuator settle down before the next haptic event is played, and thus, avoiding saturating a user with too much haptic information. In an alternate embodiment, smoother decay can be used, rather than a sharp drop to 0, when "$V_2$" of iteration "i" is smaller than "$V_2$" of iteration "i−1". A "sharpness" parameter, ranging from 0% to 100% can be used to define the amount of decay to be applied to "$V_2$": $V_3 = V_2 \times$ sharpness/m, where "m" is an integer divisor starting from 1 and increments as long as "$V_2$" of iteration "i" is smaller than "$V_2$" of iteration "i−1". According to the embodiment, "m" is reset back to 1 when "$V_2$" of iteration "i" is greater or equal to "$V_2$" of iteration "i−1", or in other words, when "$V_3$"="$V_2$". In certain embodiments, a sharpness value that is generated and stored within a reverb object is used as the sharpness parameter.

Figure 5:
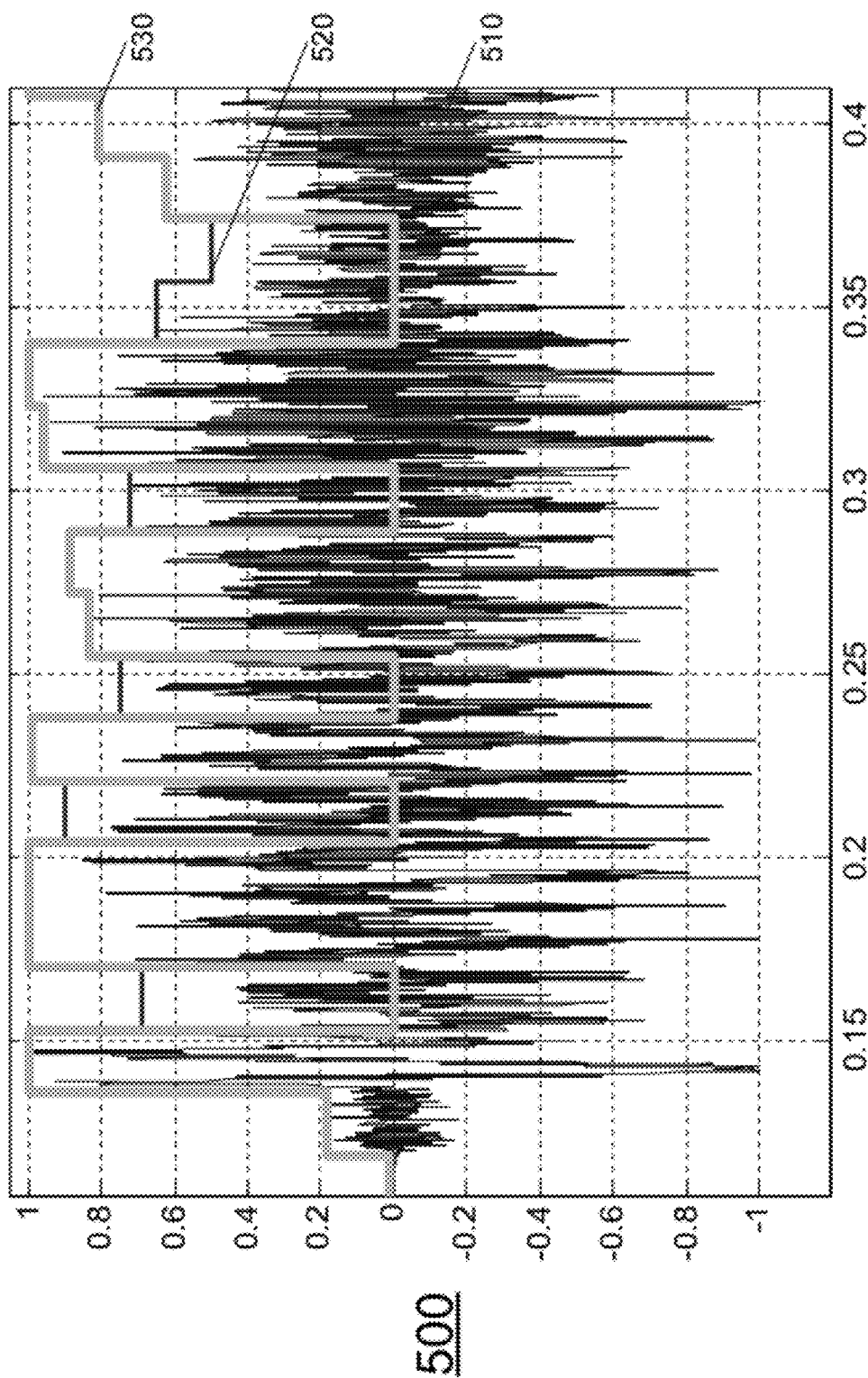
FIG. 5 illustrates an example computation of a magnitude of a haptic effect that is created based on a digital audio signal, according to one embodiment of the invention.

FIG. 5 illustrates an example computation 500 of a magnitude of a haptic effect that is created based on a digital audio signal, according to one embodiment of the invention. FIG. 5 illustrates an audio signal 510 sampled at 44100 Hz, a computed maximum value 520 for a 20 ms frame length, and pulses 530 obtained by magnitude filtering. According to the embodiment, pulses 530 capture an envelope of audio signal 510, and thus, pulses 530 can convey this information to a user through one or more haptic effects.

Figure 6:
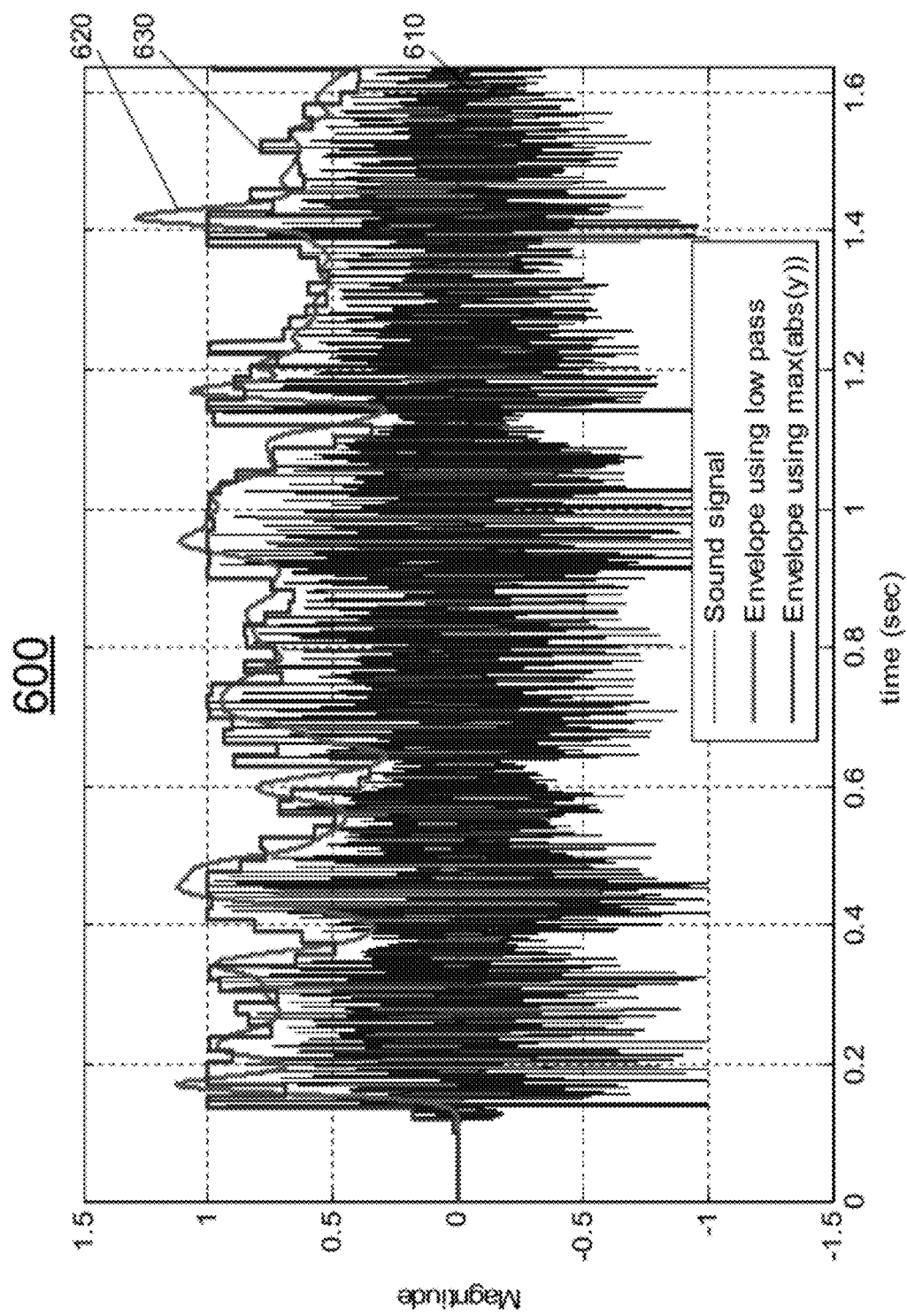
FIG. 6 illustrates an example calculation of an envelope of a digital audio signal, according to one embodiment of the invention.

FIG. 6 illustrates an example calculation 600 of an envelope of a digital audio signal, according to one embodiment of the invention. FIG. 6 illustrates an audio signal 610, an envelope 620 obtained by low-pass filtering the absolute value of audio signal 610, and an envelope value 630 computing the maximum of the absolute value over a certain frame, in this case of 20 ms.

Each frame of certain ms duration is processed in the frequency domain. Thus, in certain embodiments, a fast fourier transformation (FFT) of the frame can be used to extract the frequency content. In other embodiments, band-pass filters can be used to extract the frequency content.

In one embodiment, the frame information can be divided in bass or low frequency (for example, lower than 200 Hz), middle frequency (for example, between 240 Hz and 4000 Khz), and high frequency (for example, higher than 4400 KHz), where the middle frequency content and high frequency content is extracted using the content of the signal.

Figure 7:
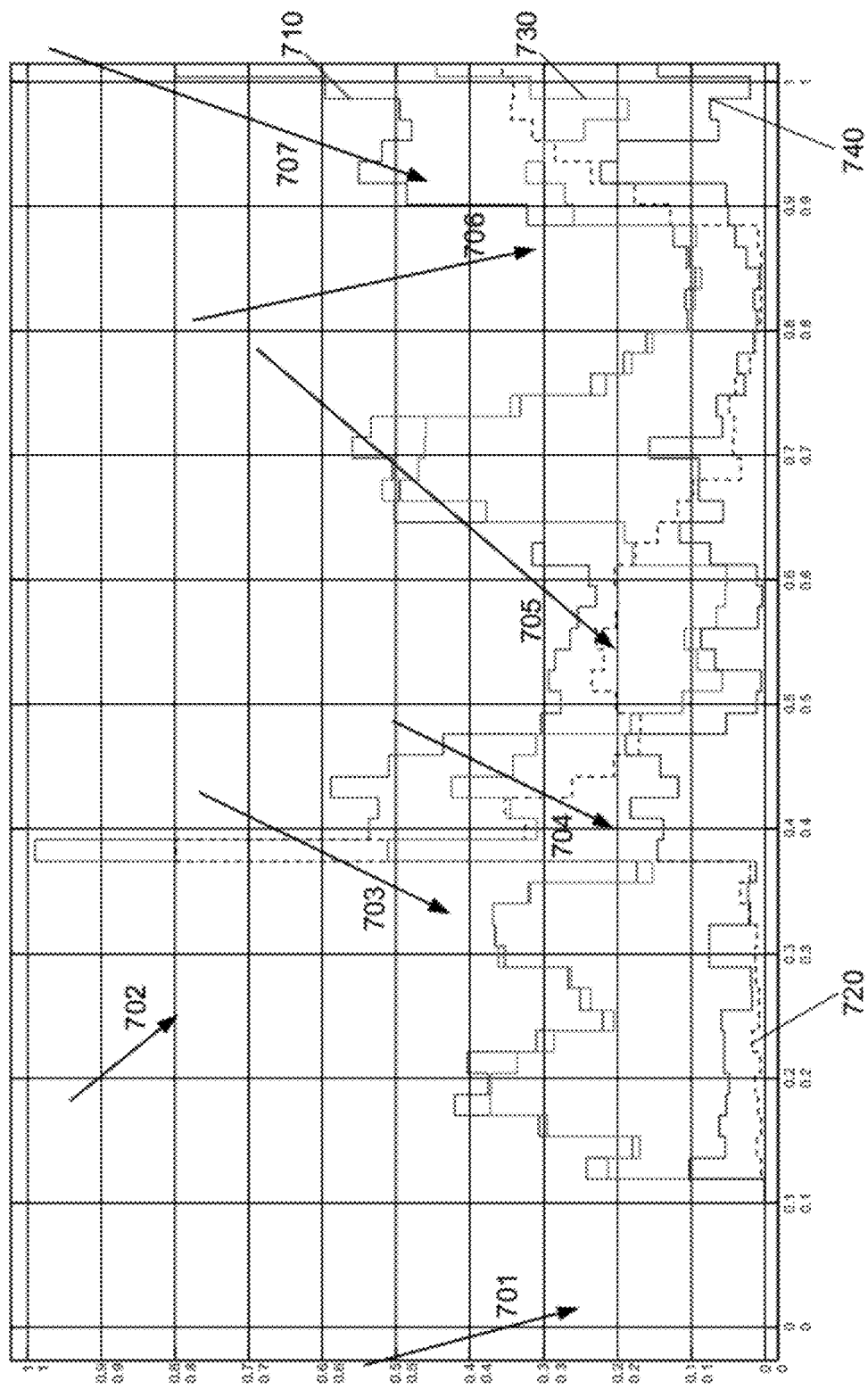
FIG. 7 illustrates an example calculation of an envelope of a digital audio signal based on frequency content, according to one embodiment of the invention.

FIG. 7 illustrates an example calculation 700 of an envelope of a digital audio signal based on frequency content, according to one embodiment of the invention. According to the embodiment, a maximum value is obtained once an audio data frame is processed as previously described. In effect, three maximum values are obtained, one for low frequency bands, one for middle frequency bands, and one for high frequency bands. As illustrated in FIG. 7, graph 710 represents an unprocessed maximum value (based on the entire audio signal), graph 720 represents a maximum value that corresponds to a low frequency range of the audio signal, graph 730 represents a maximum value that corresponds to a medium frequency range of the audio signal, and graph 740 represents a maximum value that corresponds to a high frequency range of the audio signal.

According to the embodiment, when the signal starts to be processed, the first frame contains more middle frequency content (i.e., graph 730), given the maximum value obtained which is bigger than a frequency value in the low frequency band (i.e., graph 720) and high frequency band (i.e., graph 740).

According to the embodiment, a haptic effect can be played when the content frequency of the frame is different from the frequency content of the previous frame. As illustrated in FIG. 7, the haptic effect will be played at the locations signalized by arrows 701-707.

In alternate embodiments, variations of this technique can include: playing a pulse at every frequency change with magnitude as follows: maximum magnitude of the unprocessed frame; maximum magnitude corresponding to the frequency band; maximum magnitude allowed in TouchSense software only for the first frame.

In certain alternate embodiments, if the following frames have the same frequency content then: the magnitude of the unprocessed frame can be played; or the magnitude of the processed frame can be played; or a constant vibration, perhaps small, can be played as long as the frame has the same frequency content; or the magnitude can be varied based on power content in the frequency band.

In certain alternate embodiments, a different haptic effect can be played when a frame with a different frequency content is found.

Furthermore, human perception of sounds is not linear and depends on frequency of the sound. More particularly, humans are more sensitive to low frequencies than to high frequencies. Gender and age also affect the perception. Thus, in certain embodiments, there could be a compensation factor that boosts certain frequencies. The boosting factor can be based on human perception of sound or even preference of users where some frequency bands are enhanced manually. The software can enhance, in general, the high frequency content where it is known that users have a lower sensitivity to sound. This will allow the haptic effect for a specific band to be of greater strength, and thus, enhancing the sound that, while perceived and noticed by a user's auditive system, might not have enough power.

Figure 8A:
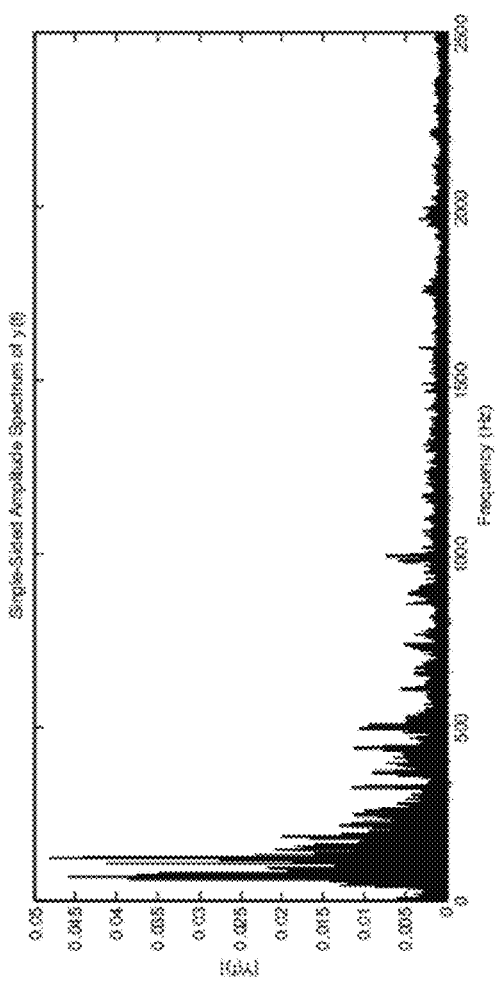
FIG. 8A illustrates an example calculation of an amplitude spectrum of a digital audio signal before the digital audio signal has been filtered, according to one embodiment of the invention.

FIG. 8A illustrates an example calculation 800 of an amplitude spectrum of a digital audio signal before the digital audio signal has been filtered, according to one embodiment of the invention. In example calculation 800, a frequency of the digital audio signal is represented along the x-axis, and an absolute value of the power at each frequency of the digital audio signal is represented along the y-axis. As illustrated in FIG. 8A, power of some magnitude is present for all frequencies.

Figure 8B:
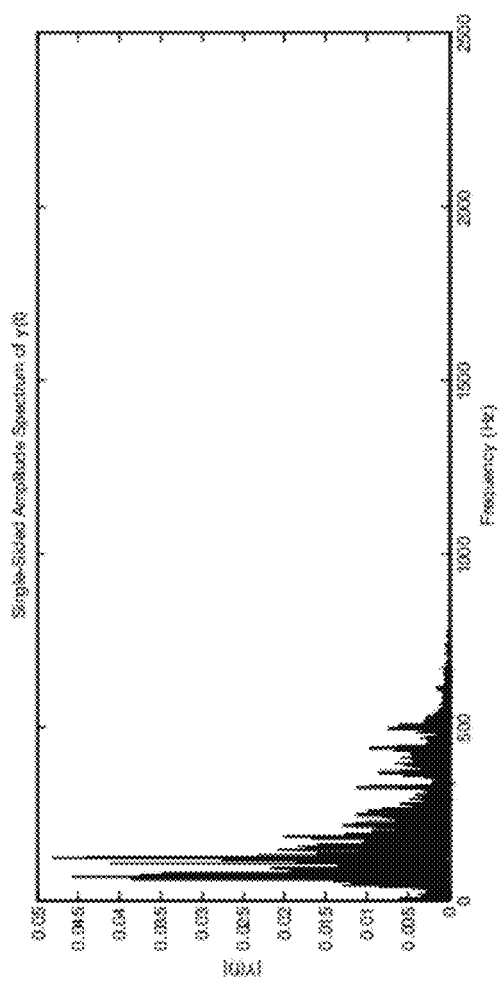
FIG. 8B illustrates an example calculation of an amplitude spectrum of a digital audio signal after the digital audio signal has been filtered, according to one embodiment of the invention.

FIG. 8B illustrates an example calculation 810 of an amplitude spectrum of a digital audio signal after the digital audio signal has been filtered, according to one embodiment of the invention. As previously described, a digital audio signal can be filtered on a single frequency band of low-frequency signals in a given audio buffer (e.g., 0-500 Hz). Similar to example calculation 800, a frequency of the digital audio signal is represented along the x-axis, and an absolute value of an amplitude of the digital audio signal is represented along the y-axis. However, as illustrated in FIG. 8B, an amplitude is only present for the single filtered frequency band of low-frequency signals (i.e., 0-500 Hz).

In certain embodiments, a user of the haptic conversion system can customize the sound-to-haptic effect conversion algorithm. More specifically, the user can choose whether a digital audio signal is filtered using a low-pass filter, a high-pass filter, or a band-pass filter. Alternatively, or in addition to customizing a filter type, the user can specify filter parameters rather than choosing between pre-defined parameters. According to these embodiments, a haptic conversion system can display one or more user-defined parameters within a graphical user interface. The user can then either choose from one or more user-defined parameters, or specify one or more user-defined parameters, using the graphical user interface. For example, a user can choose a type of filter utilized in the sound-to-haptic effect conversion algorithm from among a low-pass filter, a band-pass filter, and a high-pass filter. As another example, the user can specify one or more cut-off frequencies, where instead of a value between 250 and 500 Hz, the user can specify any values. As yet another example, the user can specify a gain that is used in the sound-to-haptic effect conversion algorithm.

In certain embodiments, rather than utilizing pre-defined filter parameters, the haptic conversion system can calculate filter parameters at runtime based on user-defined parameters. More specifically, a user can select a filter type. For example, a user can select a Butterworth design, a Bessel design, or a Chebyshev design, where for each design, a user can select a low-pass filter, a high-pass filter, a band-pass filter, or a band-stop filter. If a user selects a Chebyshev design, a user can also specify a ripple. A user can also specify a filter order, and a sample rate. A user can also specify one corner frequency if the user selected a low-pass filter or a high-pass filter, and two corner frequencies if the user selected a band-pass filter or a band-stop filter. A user can also select an optional additional zero value, and an optional lower limit of a magnitude scale. Furthermore, a user can also select whether the filter is designed by a bilinear transform method, or a matched z-transform method. The haptic conversion system can then calculate one or more filter parameters at runtime based on the parameters specified by the user.

FIG. 9 illustrates a flow diagram of the functionality of a haptic conversion module (such as haptic conversion module 16 of FIG. 1), according to one embodiment of the invention. At 910, a data frame of an audio signal is received. In certain embodiments, the audio signal is intercepted as the audio signal is streamed to a speaker. Also, in certain embodiments, the audio signal is a PCM audio buffer. The flow proceeds to 920.

At 920, a maximum value of the data frame is generated. In certain embodiments, the maximum value is generated by sampling the data frame to generate one or more sample values of the data frame, wherein the maximum value is a maximum value of the one or more sample values. In one embodiment, the one or more sample values are absolute values. In an alternate embodiment, the one or more sample values are square values. In certain embodiments, the maximum value is converted from an original maximum value using a linear conversion function. The flow proceeds to 930.

At 930, the data frame is transformed. In certain embodiments, the data frame is band-pass filtered using a band-pass filter. In these embodiments, a single frequency band of frequency signals within the data frame is filtered on. In alternate embodiments, the data frame is low-passed filtered using an IIR filter. In these embodiments, a single frequency band of frequency signals within the data frame can be filtered on. For example, a band of 0-500 Hz can be filtered on. In certain embodiments, before the data frame is transformed, the data frame is resampled. In certain embodiments, after the data frame is transformed, the digital audio signal contained with the data frame is boosted. The flow proceeds to 940.

At 940, at least one sine carrier waveform is generated based on a maximum value of the transformed data frame. In certain embodiments, the transformed data frame is scanned, and the maximum value of the transformed data frame is determined. Next, a sine function is used to retrieve a calculated sine value of the transformed data frame, based on a frequency of the transformed data frame, and a phase of the transformed data frame. Subsequently, the calculated sine value is multiplied by the maximum value of the transformed data frame, in order to create the at least one sine carrier waveform.

At 950, the transformed data frame is mixed with the at least one sine carrier waveform to generate a modulated data frame. In certain embodiments, the transformed data frame is mixed with the at least one sine carrier waveform according to a formula where the mix of the transformed data frame and the at least one sine carrier waveform is normalized.

At 960, a haptic signal is generated based on the maximum value and the modulated data frame. In certain embodiments, the maximum value determines whether the haptic signal is generated, and the modulated data frame defines a precision of the haptic signal. In certain embodiments where the maximum value determines whether the haptic signal is generated, the haptic signal is generated only when the maximum value is greater than a specified threshold. The flow proceeds to 970.

At 970, the haptic signal is sent through an actuator to generate the one or more haptic effects. In certain embodiments, the haptic signal is a waveform effect. Also, in certain embodiments, the generating and the sending the haptic signal further includes passing the modulated data frame as a parameter to an application programming interface of a haptic effect player module.

Thus, according to an embodiment, a haptic conversion system intercepts audio data frames that are part of an audio signal, converts the audio data frames into a haptic signal, where a maximum value of each audio data frame defines a sine-wave periodic carrier frequency that is mixed with each filtered audio data frame to define a waveform of the haptic signal, and plays the converted haptic signal through an actuator to generate haptic effects. The modulation of each audio data frame performed by the haptic conversion system showcases a large amount of precision and realism felt within the actuator itself, and results in more flexibility in the haptic signal that is played at the actuator.

The features, structures, or characteristics of the invention described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present invention. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the invention as discussed above may be practiced with steps in a different order, and/or with elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A computer-readable medium having instructions stored thereon that, when executed by a processor, cause the processor to convert an audio signal into one or more haptic effects, the converting comprising:
   receiving a data frame of the audio signal;
   generating a maximum amplitude value of the data frame;
   transforming the data frame;
   generating at least one sine carrier waveform based on a maximum amplitude value of the transformed data frame by calculating a sine value of the transformed data frame based on a frequency of the transformed data frame and a phase of the transformed data frame, and multiplying the calculated sine value by the maximum amplitude value of the transformed data frame;
   mixing the transformed data frame with the at least one sine carrier waveform to generate a modulated data frame;
   generating a haptic signal based on the maximum amplitude value of the data frame and the modulated data frame, wherein the maximum amplitude value of the data frame determines whether the haptic signal is generated, and wherein the modulated data frame defines a waveform of the haptic signal; and
   sending the haptic signal to an actuator to generate the one or more haptic effects.

2. The computer-readable medium of claim 1, wherein the haptic signal is generated only when the maximum amplitude value of the data frame is greater than a specified threshold.

3. The computer-readable medium of claim 1, wherein the haptic signal comprises a waveform effect.

4. The computer-readable medium of claim 1, wherein transforming the data frame comprises band-pass filtering the data frame.

5. The computer-readable medium of claim 1, wherein transforming the data frame comprises low-pass filtering the data frame.

6. The computer-readable medium of claim 1, the converting further comprising resampling the data frame before the data frame is transformed.

7. The computer-readable medium of claim 1, the converting further comprising boosting the audio signal contained within the data frame after the data frame is transformed.

8. The computer-readable medium of claim 1, wherein the transformed data frame is mixed with the at least one sine carrier waveform according to a formula where the mix of the transformed data frame and the at least one sine carrier waveform is normalized.

9. The computer-readable medium of claim 1, the converting further comprising extracting a frequency content from the data frame using a fast fourier transformation of the data frame.

10. The computer-readable medium of claim 1, the converting further comprising extracting a frequency content from the data frame using a band-pass filter.

11. The computer-readable medium of claim 1, the converting further comprising:
   dividing the data frame into low frequency content, middle frequency content, and high frequency content; and
   extracting the middle frequency content and high frequency content.

12. A computer-implemented method for converting an audio signal into one or more haptic effects, the computer-implemented method comprising:
   receiving a data frame of the audio signal;
   generating a maximum amplitude value of the data frame;
   transforming the data frame;
   generating at least one sine carrier waveform based on a maximum amplitude value of the transformed data frame by calculating a sine value of the transformed data frame based on a frequency of the transformed data frame and a phase of the transformed data frame, and multiplying the calculated sine value by the maximum amplitude value of the transformed data frame;
   mixing the transformed data frame with the at least one sine carrier waveform to generate a modulated data frame;
   generating a haptic signal based on the maximum amplitude value of the data frame and the modulated data frame, wherein the maximum amplitude value of the data frame determines whether the haptic signal is generated, and wherein the modulated data frame defines a waveform of the haptic signal; and
   sending the haptic signal to an actuator to generate the one or more haptic effects.

13. The computer-implemented method of claim 12, wherein the haptic signal is generated only when the maximum amplitude value of the data frame is greater than a specified threshold.

14. The computer-implemented method of claim 12, wherein the haptic signal comprises a waveform effect.

15. The computer-implemented method of claim 12, wherein transforming the data frame comprises band-pass filtering the data frame.

16. The computer-implemented method of claim 12, further comprising extracting a frequency content from the data frame using a fast fourier transformation of the data frame.

17. The computer-implemented method of claim 12, further comprising extracting a frequency content from the data frame using a band-pass filter.

18. The computer-implemented method of claim 12, further comprising:
dividing the data frame into low frequency content, middle frequency content, and high frequency content; and
extracting the middle frequency content and high frequency content.

19. A haptic conversion system comprising:
a memory configured to store a haptic conversion module, wherein the haptic conversion module comprises a reverb module, a boombox module, and a transformation module;
a processor configured to execute the haptic conversion module stored on the memory; and
an actuator configured to output one or more haptic effects;
wherein the reverb module is configured to receive a data frame of the audio signal;
wherein the boombox module is configured to generate a maximum amplitude value of the data frame;
wherein the transformation module is configured to transform the data frame;
wherein the boombox module is further configured to generate at least one sine carrier waveform based on a maximum amplitude value of the transformed data frame by calculating a sine value of the transformed data frame based on a frequency of the transformed data frame and a phase of the transformed data frame, and multiplying the calculated sine value by the maximum amplitude value of the transformed data frame;
wherein the boombox module is further configured to mix the transformed data frame with the at least one sine carrier waveform to generate a modulated data frame;
wherein the reverb module is further configured to generate a haptic signal based on the maximum amplitude value of the data frame and the modulated data frame, wherein the maximum amplitude value of the data frame determines whether the haptic signal is generated, and wherein the modulated data frame defines a waveform of the haptic signal; and
wherein the reverb module is further configured to send the haptic signal to an actuator to generate the one or more haptic effects.

20. The haptic conversion system of claim 19, wherein the reverb module is further configured to generate the haptic signal only when the maximum amplitude value of the data frame is greater than a specified threshold.

21. The haptic conversion system of claim 19, wherein the haptic signal comprises a waveform effect.

22. The haptic conversion system of claim 19, wherein the transformation module further comprises a band-pass filter configured to band-pass filter the data frame.

23. The haptic conversion system of claim 19, wherein the boombox module is further configured to extract a frequency content from the data frame using a fast fourier transformation of the data frame.

24. The haptic conversion system of claim 19, wherein the boombox module is further configured to extract a frequency content from the data frame using a band-pass filter.

25. The haptic conversion system of claim 19, wherein the boombox module is further configured to:
divide the data frame into low frequency content, middle frequency content, and high frequency content; and
extract the middle frequency content and high frequency content.

\* \* \* \* \*